United States Patent
Whitmyer, Jr. et al.

(10) Patent No.: US 9,147,082 B2
(45) Date of Patent: Sep. 29, 2015

(54) ELECTRONIC MESSAGING SYSTEM WITH CONFIGURABLE DELIVERY THAT MAINTAINS RECIPIENT PRIVACY

(75) Inventors: Wesley W. Whitmyer, Jr., Stamford, CT (US); Declan Whitmyer, Stamford, CT (US)

(73) Assignee: WHORLR LLC, Stamford, CT (US)

( * ) Notice: Subject to any disclaimer, the term of this patent is extended or adjusted under 35 U.S.C. 154(b) by 231 days.

(21) Appl. No.: 13/571,943

(22) Filed: Aug. 10, 2012

(65) Prior Publication Data

US 2012/0303734 A1 Nov. 29, 2012

Related U.S. Application Data

(63) Continuation-in-part of application No. 13/315,045, filed on Dec. 8, 2011.

(60) Provisional application No. 61/534,201, filed on Sep. 13, 2011.

(51) Int. Cl.
*H04L 29/12* (2006.01)
*H04L 12/58* (2006.01)
*G06Q 10/10* (2012.01)
*G06F 21/62* (2013.01)

(52) U.S. Cl.
CPC ........ *G06F 21/6218* (2013.01); *H04L 12/5855* (2013.01); *H04L 61/1547* (2013.01); *H04L 61/1564* (2013.01); *G06F 2221/2141* (2013.01); *G06Q 10/107* (2013.01); *H04L 51/00* (2013.01)

(58) Field of Classification Search
CPC ....... H04L 63/08; H04L 63/10; H04L 63/102; H04L 63/104; H04L 12/5855; H04L 12/58; H04L 61/1547; H04L 61/1564; H04L 51/00; H04L 51/14; H04L 51/28; G06F 21/6245; G06F 21/62; G06Q 10/107
USPC .............................................................. 726/4
See application file for complete search history.

(56) References Cited

U.S. PATENT DOCUMENTS

| | | | | |
|---|---|---|---|---|
| 5,493,564 | A * | 2/1996 | Mullan ........................ | 370/351 |
| 6,711,154 | B1 * | 3/2004 | O'Neal ........................ | 370/352 |
| 7,478,140 | B2 * | 1/2009 | King et al. .................... | 709/217 |
| 7,765,262 | B2 * | 7/2010 | Gross et al. ................... | 709/206 |
| 7,788,495 | B2 | 8/2010 | Anthe, II et al. | |
| 7,953,846 | B1 * | 5/2011 | Amoroso et al. ............. | 709/224 |
| 8,438,382 | B2 | 5/2013 | Ferg et al. | |
| 2002/0023059 | A1 | 2/2002 | Bari et al. | |
| 2002/0124188 | A1 | 9/2002 | Sherman et al. | |
| 2003/0023691 | A1 * | 1/2003 | Knauerhase .................. | 709/206 |
| 2003/0110400 | A1 | 6/2003 | Cartmell et al. | |
| 2004/0111478 | A1 * | 6/2004 | Gross et al. ................... | 709/206 |
| 2004/0196858 | A1 * | 10/2004 | Tsai et al. ..................... | 370/401 |
| 2004/0201625 | A1 * | 10/2004 | Karamchedu et al. ........ | 345/752 |
| 2005/0108351 | A1 * | 5/2005 | Naick et al. ................... | 709/207 |
| 2006/0031302 | A1 * | 2/2006 | Nuortila ....................... | 709/206 |

(Continued)

*Primary Examiner* — Eleni Shiferaw
*Assistant Examiner* — Nelson Giddins
(74) *Attorney, Agent, or Firm* — Whitmyer IP Group LLC

(57) ABSTRACT

A messaging service allows message senders to reach a web site owner in the way the owner wants. Users authorized by the owner drop a message into the message service of a site owner, and it gets delivered to the site owner in exactly the manner specified by the site owner. The site owner can organize incoming messages by time, calendar, user, or viewing method. The site owner can receive messages in the way she wants, but all her friends need to know is one address, the owner's site address.

27 Claims, 9 Drawing Sheets

(56) References Cited

U.S. PATENT DOCUMENTS

| | | |
|---|---|---|
| 2006/0053279 A1 | 3/2006 | Coueignoux |
| 2006/0148455 A1 | 7/2006 | Kim |
| 2006/0229900 A1 | 10/2006 | Paul et al. |
| 2007/0245416 A1 | 10/2007 | Dickinson, III et al. |
| 2007/0299926 A1 | 12/2007 | Malik |
| 2008/0147812 A1* | 6/2008 | Curtis ............................ 709/206 |
| 2008/0256201 A1 | 10/2008 | Flowers et al. |
| 2008/0281937 A1* | 11/2008 | Matsa et al. .................. 709/207 |
| 2008/0288478 A1 | 11/2008 | Klug et al. |
| 2009/0070351 A1 | 3/2009 | Klug et al. |
| 2009/0132713 A1 | 5/2009 | Dutta et al. |
| 2009/0234876 A1* | 9/2009 | Schigel et al. ................ 707/102 |
| 2009/0327421 A1 | 12/2009 | Fu et al. |
| 2010/0063963 A1 | 3/2010 | Whitmyer, Jr. |
| 2010/0146059 A1* | 6/2010 | DellaFera et al. ............ 709/206 |
| 2010/0235494 A1 | 9/2010 | Sood et al. |
| 2010/0287246 A1* | 11/2010 | Klos et al. ..................... 709/206 |
| 2010/0299399 A1 | 11/2010 | Wanser et al. |
| 2011/0087877 A1* | 4/2011 | Dagg et al. .................... 713/150 |
| 2011/0145355 A1* | 6/2011 | Mattern ......................... 709/206 |
| 2012/0011067 A1 | 1/2012 | Katzin et al. |
| 2012/0078958 A1 | 3/2012 | Whitmyer, Jr. |
| 2012/0079568 A1 | 3/2012 | Whitmyer, Jr. |
| 2012/0084841 A1 | 4/2012 | Whitmyer, Jr. |
| 2012/0084842 A1 | 4/2012 | Whitmyer, Jr. |
| 2012/0158521 A1 | 6/2012 | McCullen |
| 2012/0159307 A1 | 6/2012 | Chung et al. |
| 2012/0272136 A1 | 10/2012 | Takami |
| 2013/0297715 A1 | 11/2013 | Whitmyer, Jr. |

\* cited by examiner

ELECTRONIC MESSAGING SYSTEM WITH CONFIGURABLE DELIVERY THAT MAINTAINS RECIPIENT PRIVACY

CROSS-REFERENCE TO RELATED APPLICATIONS

The present application is a continuation-in-part of pending U.S. patent application Ser. No. 13/315,045 filed Dec. 8, 2011, which claims the benefit of, pursuant to 35 U.S.C. 119(e), U.S. Provisional Patent Application No. 61/534,201, filed on Sep. 13, 2011, the content of which is incorporated herein by reference.

FIELD OF THE INVENTION

This application relates to electronic messaging systems, and more particularly to configurable electronic messaging systems that maintain recipient privacy.

BACKGROUND OF THE INVENTION

Unified messaging systems are well known. These systems redirect incoming electronic messages from a user's many message boxes, e.g., email, voicemail, fax, to one 'unified' inbox. The systems are designed to improve efficiency for recipients by allowing them to monitor a single inbox for electronic messages of many different types. Typically, these systems are used in large corporations that have sophisticated email servers on which all electronic messages can be directed into a single inbox, most often and email address. While these systems have some utility in an integrated corporate environment they are not truly 'unified' because they are not designed to handle all the types of messages, e.g., text messages, used in modern business.

Also known, in corporate email servers and otherwise, is the ability to route incoming messages from a single published message address to multiple other message boxes according to automatic rules that can be designed and implemented by the published address owner. Although the owner of such a published message address can receive messages in the way he wants (preferred box and format), he cannot control use of his published address, which may be sold to spammers. A further problem is that the published address is often the username for other Internet computing resources. In addition, if the recipient changes her messaging address, for reasons of security or otherwise, she must communicate the change to all senders, each of whom must continually update their address books in an ongoing burden.

What is desired in another respect, therefore, is a system, which keeps message addresses private but still allows incoming messages to be routed to one of several electronic inboxes as desired by the recipient/owner. Also desired is the ability to route incoming messages to a private address to an electronic box of a different messaging format, and the ability to limit incoming messages to an approved sender list. The ability to route the messages according to a matrix of parameters such as sender, time, date, etc. is also desirable.

SUMMARY OF THE INVENTION

Accordingly, it is an object of the invention to provide a messaging system, which keeps message addresses private but still allows incoming messages to be routed to one of several electronic inboxes as desired by the recipient/owner.

Another object of the invention is to provide a messaging system that has the ability to route incoming messages to a private address to an electronic box of a different messaging format, and the ability to limit incoming messages to an approved sender list.

Another object of the invention is to provide a messaging system with the ability to route messages according to a matrix of parameters, such as sender, time, date, etc.

These and other objects of the present invention are achieved by provision of a messaging service that allows message senders to reach a web site owner in the way the owner wants. Users authorized by the owner drop a message into the message service of a site owner, and it gets delivered to the site owner in exactly the manner specified by the site owner. The site owner can organize incoming messages by time, calendar, user, viewing method, etc. The site owner can receive messages in the way she wants, but all her friends need to know is one address, the owner's site address.

With the system of the present invention, each owner is provided with a messaging service inbox that the owner can chose to associate with his personal site. The messaging service has some unique characteristics that put the owner in control of her incoming electronic messages and preserve her privacy in the process. The messaging service inbox of the present invention differs from other electronic messaging systems in several important ways. First, recipients have no address so there is nothing to be harvested or spammed and the owner is free to change his electronic inboxes at any time without any disruption in message delivery or burden on senders to update their address books. Second, only senders authorized by the owner have access to the owner's messaging service inbox. This means messages from any particular person can be permanently blocked by the recipient/owner at any time.

By employing the system of the present invention, users do not need to remember which cell phone number the site owner is currently using, which email address is still valid, where to find those photos from the site owner's last outing, or how to subscribe to the site owner's Twitter feed. Everything is right in one place and users have access to it all on an owner's site. Once users navigate to an owner's site, they have instant access to the site owner in the manner that the owner desires.

DETAILED DESCRIPTION OF THE INVENTION

Figure 1:
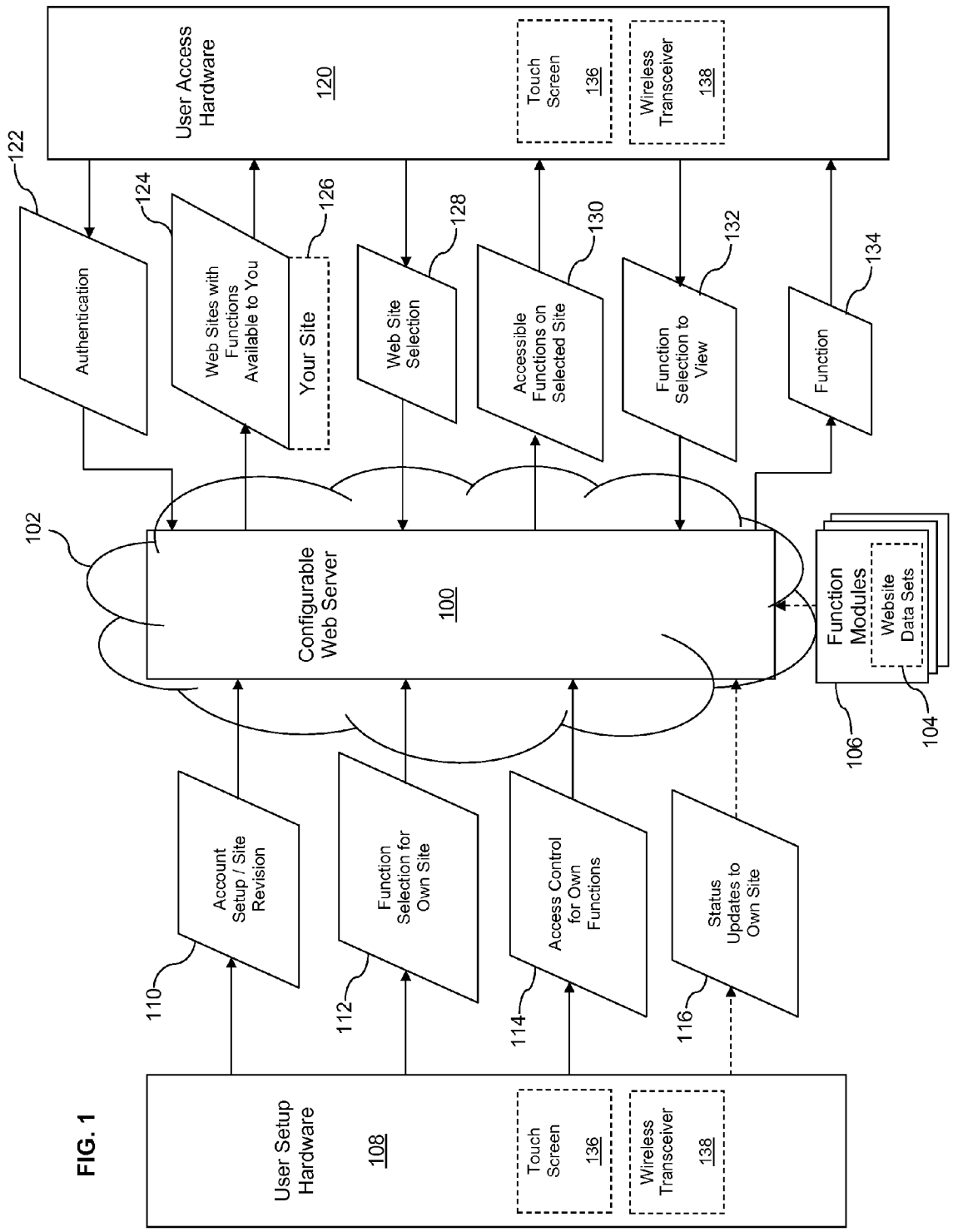
FIG. 1 is a block diagram illustrating a configurable web server system according to the invention.

FIG. 1 depicts structures and operations pertaining to a configurable website and system with access control and social network features in accordance with the invention.

A configurable website according to the invention enables an owner to provide a user with access to the functionality of other websites. The authority to access this functionality is supplied on a per-function basis. For example, a user can be granted the use of certain functions of a particular website, but not to others, such as being granted the ability to read content on the website, but not to modify it. Or the ability to modify text on the website, but not images. Furthermore, the user can be granted different degrees of authority over the functionality of several websites. For instance, the user could be granted access only to read content on website A, but be granted access to modify as well as read content on website B, and so forth. Optionally, many users can access the configurable website, each being granted specific authority to access functionality on other websites. Furthermore, the configurable website itself can include functions and content to which specific access can be granted to users in the same way. These functions may be individual to the configuration webpage, or may be an aggregate of the functionality and content of the other webpages. These examples are not intended to be limiting, and it will be clear to those having skill in the art that many combinations of functionality authorizations are possible without departing from the spirit of the invention.

To this effect, a configurable web server 100 is provided connected to a network 102. Web server 100 has access to various function modules 106 over network 102, at least one of which function modules may include website data sets 104.

Figure 1A:
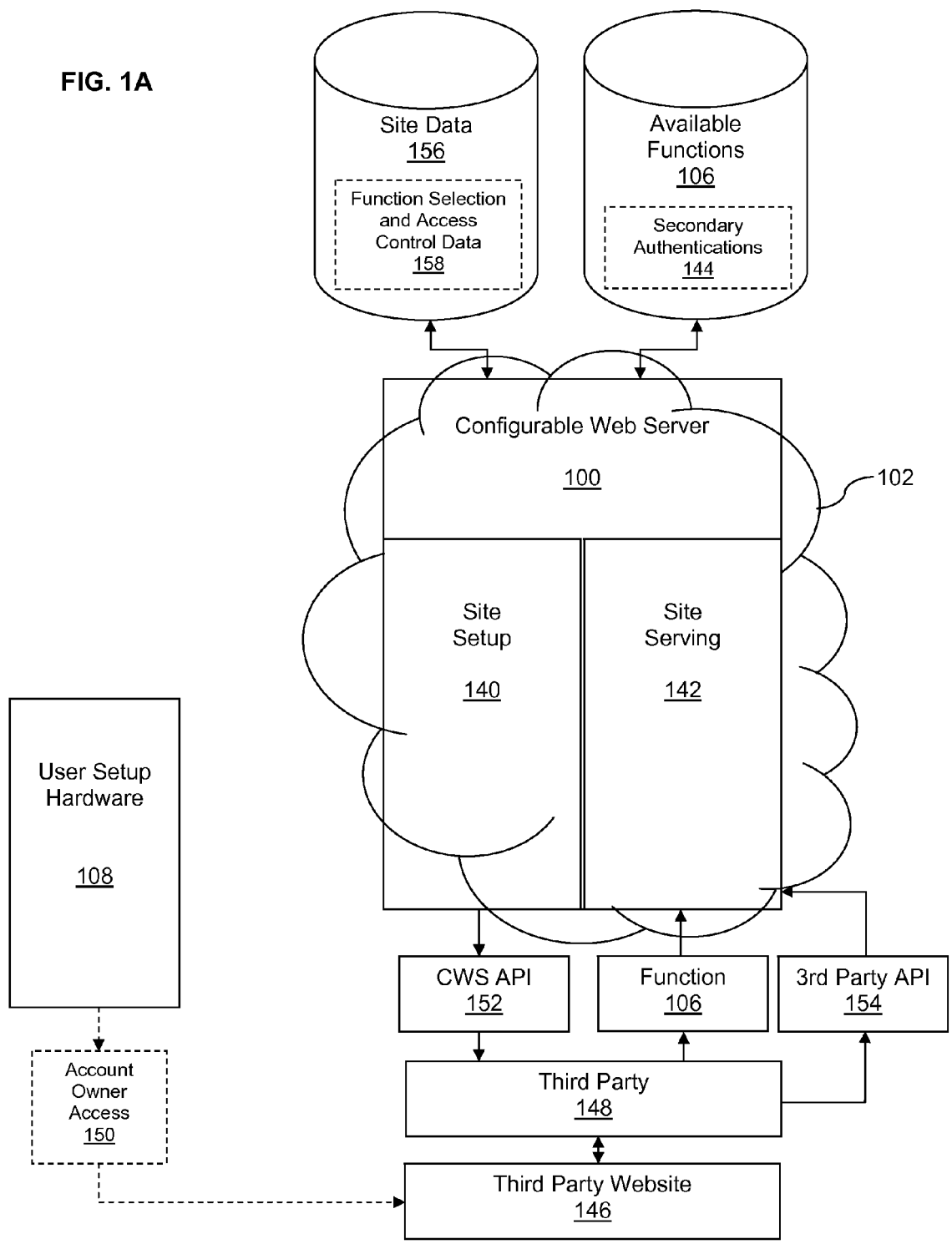
FIG. 1A is a block diagram illustrating in more detail a portion of the configurable web server system of FIG. 1.

The configurable web server 100 may be a traditional web server or any other hardware and/or software for serving a website to visitors, with a more detailed view of a preferred embodiment of the web server 100 being shown in FIG. 1A. The network 102 may be the internet, a subset of the internet, a local area network, wide area network, wireless network, cloud, or other arrangement for computer communications. Website data sets 104 can relate to any type of website, including social networking websites that provide a homepage, blog, comment posting, syndication, or other such functionality to the owner, and may require authentication for access to all or part of their content. Website data sets 104 may relate to websites requiring authentication for use on a per-function basis however, in which case, website data sets 104 may include data relating to a secondary authentication to an Internet computing resource.

Web server 100 can be used to generate a configurable website (not shown) for use as an interface, whereby an owner can aggregate content from website data sets 104, and can control access to websites on a per-user and per-function basis. In this regard, web server 100 can be viewed as having a site setup portion 140 and a site serving portion 142.

Function modules 106 can be accessed by the owner for incorporation into the configurable website, and can include various basic functionality for running a website, including applets, scripts, templates, style sheets, and the like. Function modules 106 may be provided on the web server 100, or be provisionable from third parties 148 that hosting third party websites 146 that may be made available to the system 100 over network 102. The third party websites 146 may also be directly accessed by the webpage owners using user setup hardware 108 in the usual way of employing account owner access 150.

Example function modules 106 can include website data sets 104 which may include a secondary authentication 144 to a computing resource, such as a third party website 146, such as a web server hosting a social media site (not shown). Further example function modules 106 can include an application programming interface ("API"), which may be used to retrieve and display data, change data, or supplement data. The API can be a configurable web server API 152 provided to a third party 148 for modification, or can be entirely created by the third party 148, before being uploaded to the web server 100 as a third party API 154. Function modules 106 may be generated by a third party (as shown in FIG. 1A) and may provide access on the configurable website to third party data. As another example, function modules may simply comprise data itself. For example, individual pieces of art and blog posts may be tagged with permissions instead of subjects when they are uploaded. In this manner, new art only shows up in the appropriate collection(s) and blog posts are only viewable by the intended user/group.

User setup hardware 108 is also connected to network 102 and is accessible to the owner. Using the user setup hardware 108, the owner can transmit account setup or site revision data 110, a selection of functions 112 to be enabled on the configurable website, access control 114 for functions enabled on the configurable website, and optionally, status updates 116, to system 100.

User setup hardware 108 can be a computer, laptop, mobile device, smartphone, or other device for accessing a web server. Account setup or site revision data 110 may include information for running the configurable website, including owner personal information, passwords and multifactor authentications to access the configurable website, correspondence information such as e-mail addresses, information pertaining to the desired display of the configurable website, and URLs for the various websites that can be managed using the system 100.

Account setup data 110 may include authentications which serve as access credentials for other website data sets 104 in addition to the configurable website. Access credentials can include passwords, multifactors, tokens, or other ways of controlling access to each website. Optionally, a permitted user list (not shown) is associated with the configurable website, website data sets 104, and/or function modules 106.

Optionally, website date sets 104 relate to social networking websites (not shown). Social networking websites may include but are not limited to websites for creating and connecting public, private, and semi-public user profiles, online communities, blogs, news feeds, audio and video sharing, and web syndication websites. Such websites are frequently closed-silo communities where only third party users having an account on that particular website would be able to view or interact with content belonging to an owner of a profile. The present invention provides the advantage of supplying access to an owner's information that is stored in such closed-silo communities, without requiring third party users to first obtain an account of their own.

Functions 112 can include a selection of functions 106 enabled for the configurable website. For instance, the owner can choose to enable content posting on the configurable website itself. Access control 114 is also specified for the functions enabled on the configurable website, i.e., who can access each function. Optionally, status updates 116 to the configurable website can be transmitted to system 100 from the user setup hardware 108 if this functionality has been selected. This various site data 156, including the function selection and access control date 158, specified by the owner may be stored in a database or other memory accessible to the web server 100.

To access the configurable website (not shown), user access hardware 120 is accessible to either the owner or to third party users of the configurable website and is connected to network 102. User access hardware 120 can be a computer, laptop, mobile device, smartphone, or other device for accessing a webpage, and optionally, can be the same hardware used as the user setup hardware 108. The user first transmits an authentication 122 from the user access hardware 120 to the system 100. Authentication 122 may be a password, multi-factor authorization, hardware token, or other way of controlling access to the configurable website. System 100 responds by transmitting accessible website data 124, regarding websites with functions that are accessible to that user. If the user is the owner or another user with proper authorization, accessible website data 124 can also include data regarding the configurable website itself. Subsequently, the user can select a website from amongst the accessible website data 124, and transmit website selection 128 from user access hardware 120 to system 100. System 100 then responds by transmitting accessible function data 130 to user regarding functions that are accessible to that user for the selected accessible website. The user can then select a function, and transmit function selection 132 from user access hardware 120 to system 100.

User setup hardware 108 and/or user access hardware 120 may optionally include a touch screen 136 to facilitate user input, and/or may optionally include a wireless transceiver 138 to enable wireless communication.

Accessible website data 124, accessible function data 130, and selected function 134 will typically be transmitted to the user access hardware 120 from system 100 as a webpage, for display to the user on a GUI (not shown), as further discussed below. The GUI may be a combination of a display and driver software. Optionally, the accessible website data 124 and accessible function data 130 are presented to the user as thumbnail images (not shown) within a webpage. Thumbnail images may be a miniaturized image of the webpage or function they represent, or may be a different image.

Figure 2:
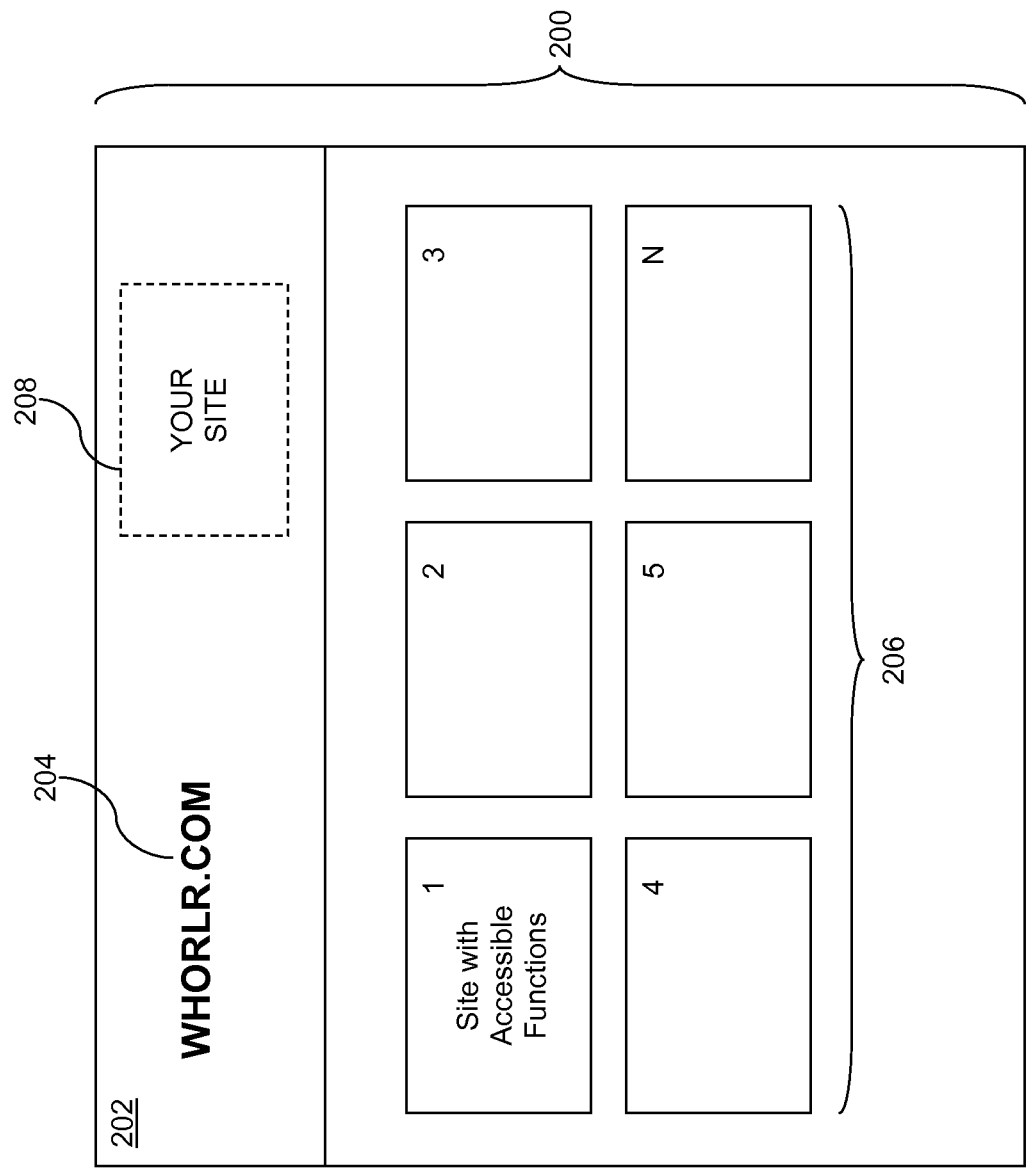
FIG. 2 is an illustration of an example web page served by the configurable web server system of FIG. 1.

FIG. 2 illustrates an example display 200. Display 200 is an example of a page of the configurable website, which displays a selection of websites to which the user has been granted access via the configurable website. These websites may be represented by thumbnail images 206. Display 200 may have a title bar 202 which displays a title 204. If the user is the owner, or has been granted an appropriate level of authority, a thumbnail 208 representing the configurable website itself may also be displayed.

Optionally, display 200 is displayed on user access hardware 120 and reflects accessible website data 124 transmitted from system 100, as shown and described with respect to FIG. 1. In some embodiments, the user can choose a thumbnail 206, 208 using a mouse cursor or other suitable selection means (not shown). A website selection 128 reflecting this choice is then transmitted as shown and described with respect to FIG. 1.

Figure 3:
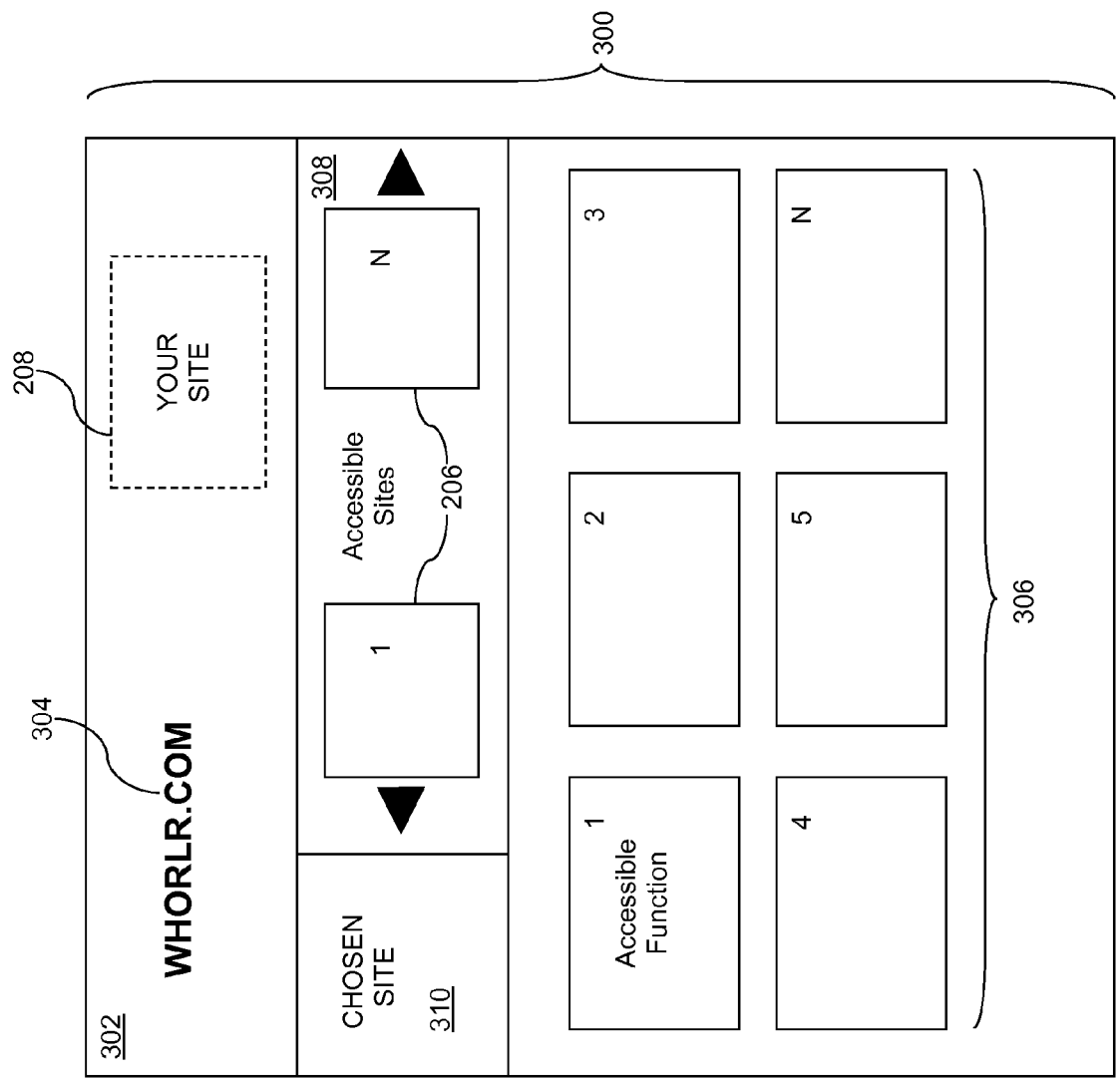
FIG. 3 is an illustration of an example web page served by the configurable web server system of FIG. 1.

FIG. 3 illustrates an example display 300. Display 300 may have a title bar 302 which displays a title 304. Display 300 displays thumbnail images 306 representing various website functions to which the user has been granted access by the owner of the configurable website, pertaining to a website chosen from display 200 (FIG. 2). A website selection bar 308 displays thumbnail images 206 as described with respect to FIG. 2. If the user is the owner, or has been granted an appropriate level of authority, a thumbnail 208 representing the configurable website itself may be displayed in website selection bar 308, or in title bar 302. A chosen website indicator 310 displays a thumbnail image of the currently chosen website, whose accessible functions are shown by thumbnail images 306.

Optionally, display 300 is displayed on user access hardware 120 and reflects accessible function data 130 transmitted from system 100, as shown and described with respect to FIG. 1. In some embodiments, the user can choose a thumbnail image 306 using a mouse cursor or other suitable selection means (not shown). A function selection 132 reflecting this choice is then transmitted as shown and described with respect to FIG. 1. Optionally, the user can also choose a thumbnail 308, 208 to view accessible functions for a different website (not shown). A website selection 128 reflecting this choice is transmitted as shown and described with respect to FIG. 1.

Figure 4:
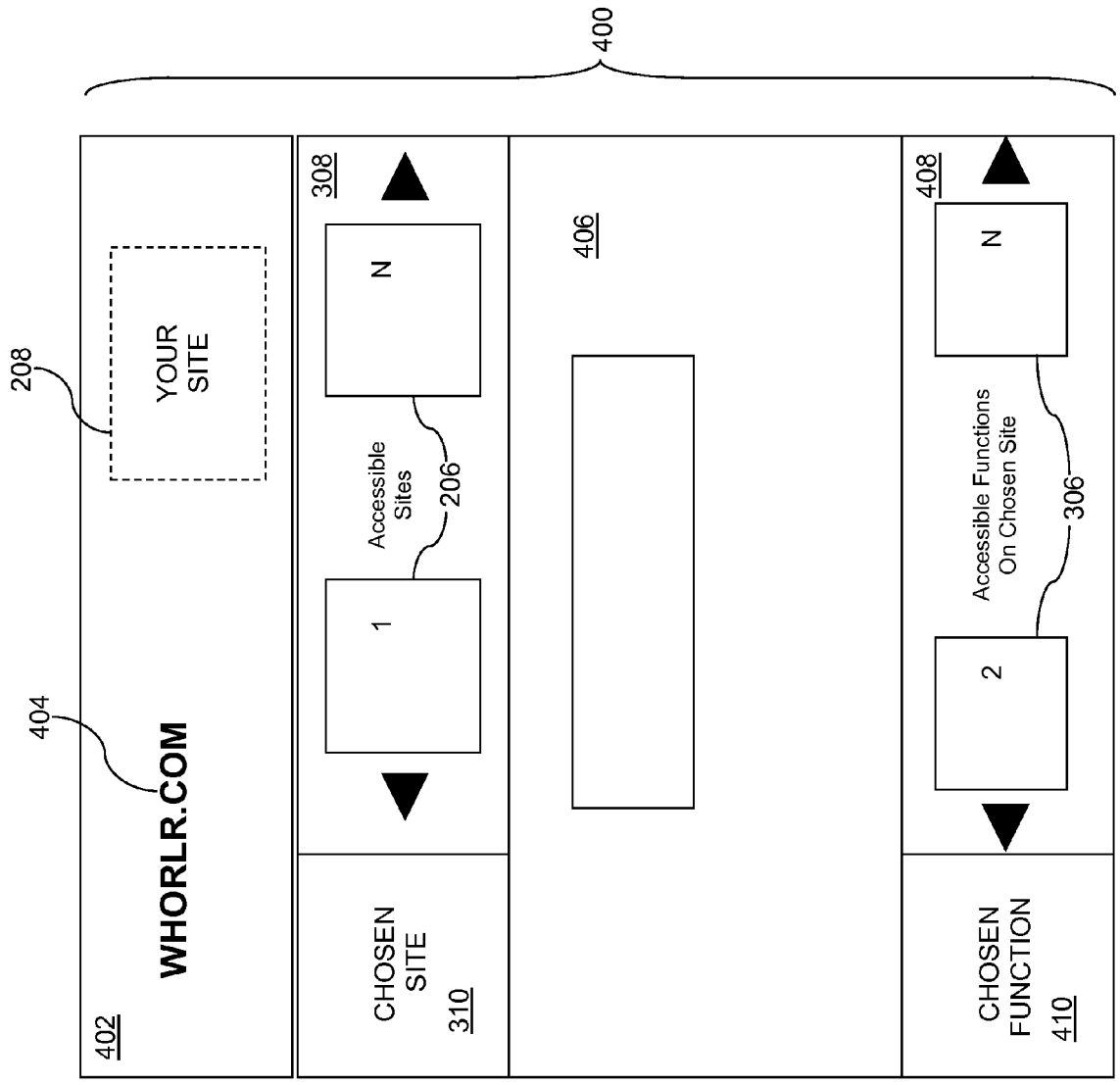
FIG. 4 is an illustration of an example web page served by the configurable web server system of FIG. 1.

FIG. 4 illustrates a display 400 according to an embodiment of the invention. Display 400 may have a title bar 402 which displays a title 404. Display 400 displays and provides access to a function 406 to which the user has been granted access by the owner of the configurable website. The function 406 may have been chosen from display 300 (FIG. 3). The user may interact with function 406 via display 400. For example, the user may edit text data if function 406 provides this capability.

Function selection bar 408 displays thumbnail images 306 as described with respect to FIG. 3. Chosen function indicator 410 displays a thumbnail image of the currently chosen function 406. Website selection bar 308 displays thumbnail images 206 as described with respect to FIG. 2. If the user is the owner, or has been granted an appropriate level of authority, a thumbnail 208 representing the configurable website itself may be displayed in website selection bar 308, or in title bar 402. Chosen website indicator 310 displays a thumbnail image of the website whose accessible functions are shown by thumbnail images 306.

Thumbnail images 306 representing various website functions to which the user has been granted access by the owner of the configurable website, pertaining to a website chosen from display 200 (FIG. 2).

Display 400 can be displayed on user access hardware 120 and reflects accessible function data 130 transmitted from system 100, as shown and described with respect to FIG. 1. In some embodiments, the user can choose a thumbnail image 306 using a mouse cursor or other suitable selection means (not shown). A function selection 132 reflecting this choice is then transmitted as shown and described with respect to FIG. 1.

The user may also choose a thumbnail 308, 208 to view accessible functions for a different website (not shown) or chose a thumbnail 408 to access a different function A website selection 128 reflecting this choice is transmitted as shown and described with respect to FIG. 1.

Figure 5:
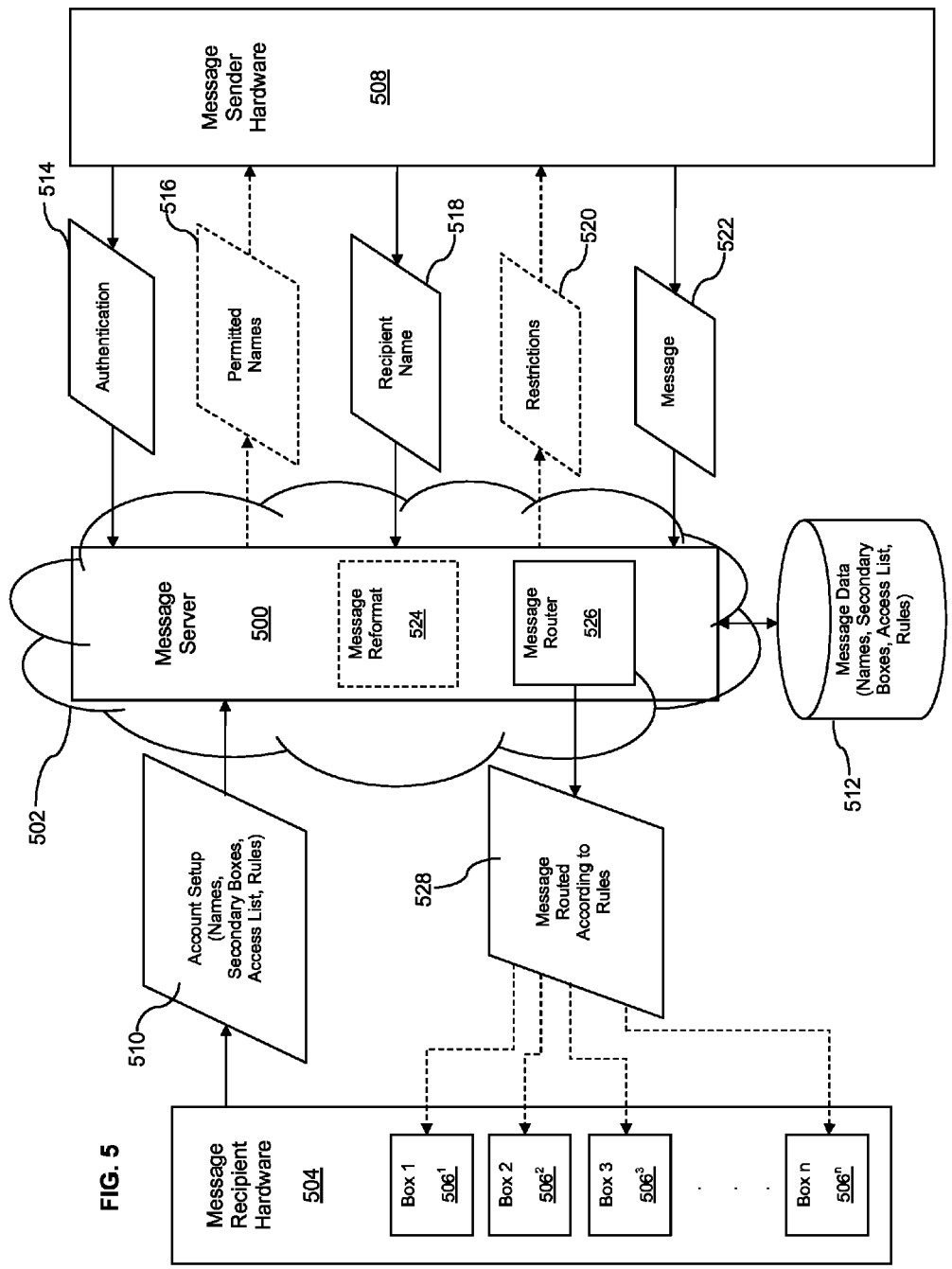
FIG. 5 is a block diagram illustrating messaging system in accordance with the present invention, which may be used in conjunction with the configurable web server system of FIG. 1 or independently thereof.

FIG. 5 depicts structures and operations pertaining to a messaging system in accordance with another aspect of the present invention, which may be used in conjunction with the configurable web server system of FIG. 1 or independently thereof.

The system includes a message server 500 connected to a network 502. Message server 500 may be a traditional mail server, web server or any other hardware and/or software for serving messages. The network 502 may be the Internet, a subset of the Internet, a local area network, wide area network, wireless network, cloud, or other arrangement for computer communications.

Message recipient hardware 504 is also connected to network 502 and is in communication with the message server 500. Message recipient hardware 504 can be a computer, laptop, mobile device, smartphone, or other device for communicating with a message server, and can be the same hardware as user setup hardware 108 described above when the messaging system is used in conjunction with the configurable website system described above, or can be separate therefrom. Message recipient hardware 504 is also used to access one or more recipient electronic mailboxes $506^1$-$506^n$, each of which may be configured in any known or yet to be developed messaging format.

The electronic mailboxes $506^1$-$506^n$ may include, for example, mailboxes for receiving email, text or SMS messages, facsimiles, voice messages, and document uploads to a server (e.g., via FTP). In some embodiments, system further allows for the receipt of live telephone calls. As such, the system can handle the receipt and transmission of any and all the types of messages.

Message sender hardware 508 is also connected to network 502 and is in communication with the message server 500. Message sender hardware 508 can be a computer, laptop, mobile device, smartphone, or other device for communicating with a message server, and can be the same hardware as user access hardware 120 described above when the messaging system is used in conjunction with the configurable website system described above, or can be separate therefrom. Message sender hardware 508 is preferably configured to be able to read and manipulate web pages, as described in more detail below.

Figure 6:
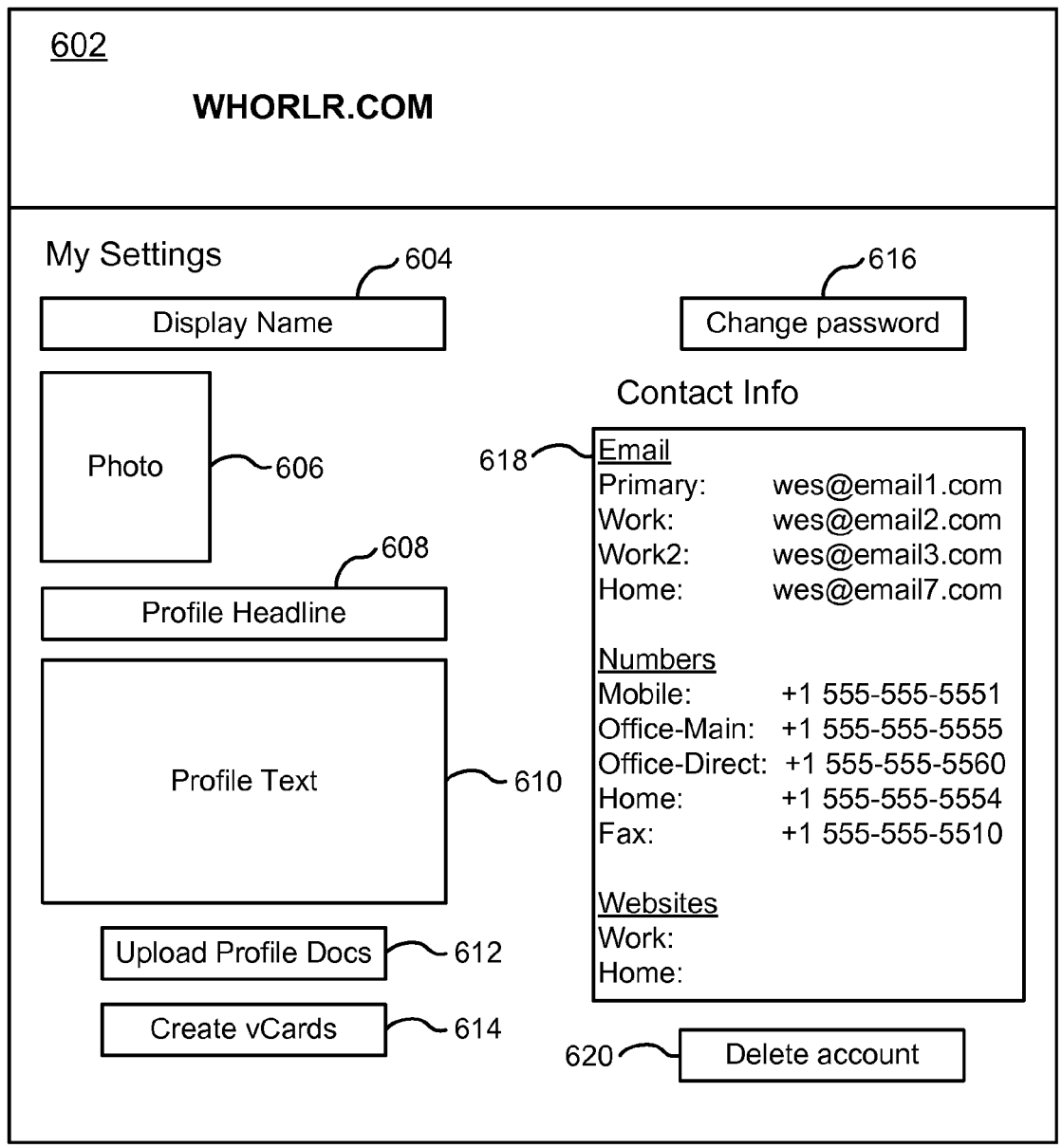
FIG. 6 is an illustration of an example display generated by the configurable web server system of FIG. 1.

Initially, the message recipient uses message recipient hardware 504 to configure his messaging account by supplying account setup message data 510 to message server 500 (see, e.g., FIG. 6). This message data may include a name or names associated with the message recipient, a list of one or more secondary electronic mailboxes to which the message recipient has access, an access list of senders authorized to send messages to the message recipient, and messaging routing rules. The message routing rules may be dependent, for example, upon parameters such as message sender (e.g., all messages from Sender A should be routed to Box 2), time of day (e.g., all messages received after 5:00 pm should be routed to Boxes 1 and 3), days of the week (e.g., all messages received on Saturdays should be routed to Box 3), particular dates (e.g., all messages received from Jan. 1, 2011-Jan. 8, 2011 should be routed to Boxes 1 and 2), etc. The rules may also comprise a matrix dependent upon two or more parameters (e.g., all messages received from Sender B after 10:00 pm should be routed to Box 2). Upon receipt of account setup message data 510, or changes thereto, by message server 500, message server may store the message data in a database 512 or other memory. Furthermore, the rules may specify one or more particular formats in which the recipient desires to receive messages for each of her electronic mailboxes.

When a message sender desires to send a message to a message recipient using the system of the present invention, the message sender may use message sender hardware 508 to supply an authentication 514 to message server 500. In response, the message server 500 may, based upon the authentication 514 and the message data stored in database 512, transmit to message sender hardware 508 a list of permitted names 516 to whom the message sender is authorized to send messages. The message sender may then select a recipient name from the list and transmit the selected recipient name 518 to the message server 500.

Alternately, the transmission of the list of permitted names 516 may be omitted, and the message sender hardware 508 may be used to transmit both the authentication 514 and the recipient name 518 without the list of permitted 516 names being provided. In this case, the message server 500 may analyze the authentication 514 and the recipient name 518 against the message data stored in database 512 in order to determine whether the message sender is authorized to send messages to the identified message recipient.

This may be the case, for example, when each message recipient has his own personal web page, similar to that described above in connection with the configurable website system shown in FIG. 1, such that the message sender may simply choose a "send message" function from the recipient's web page (it being the case that if the "send message" function is available for selection, the would-be message sender would have been authorized to send messages).

In any event, is it preferred that the message is received from the message sender via a non-public electronic mailbox address. More specifically, it is highly desirable that the manner in which the message is received from the message sender be strictly limited only to authorized message senders, and that the addresses for the secondary electronic mailboxes to which the message recipient has access, be kept private so as to prevent spammers from being able to obtain access to the electronic mailboxes of the message recipient.

Once the recipient name has been received, the message server may optionally transmit to message sender hardware 508 a description of any restrictions 520 placed on the message sender by the message recipient, as contained in the message data stored in database 512. The message sender hardware may then be used to create and transmit a message 522 to the message server 500. In one embodiment, the message server 500 may serve a web page to message sender hardware 508 with message creation and transmission functionality, thereby allowing messages to be send by any message sender hardware 508 capable of viewing and manipulating web pages.

Once the message 522 is received by the message server 500, the message server 500 examines the parameters surrounding receipt of the message 522 in view of the message data stored in database 512. Message reformat software 524 may optionally be provided for translating the message 522 into a desired format (e.g., email, text or SMS message, facsimile, voice message, document upload to a server, etc.) specified in the message data stored in database 512, if necessary. Message router software 526 then determines, based upon the parameters surrounding receipt of the message 522, the message data stored in database 512 (particularly, the rules and secondary mailbox information) and any necessary extrinsic information, such as time, date, etc. to which electronic mailbox or mailboxes the message should be routed, before routing the message 528 to the appropriate electronic mailbox or mailboxes.

FIG. 6 illustrates a display 602 generated by the system for setting up and editing a user profile. The settings may include a display name 604, a photograph 606, a profile headline 608, and profile text 610. The settings page further includes functions to upload profile documents 612 (e.g., for sharing with other users), creating a vCard 614, changing a user password 616, and deleting a user account 620. As shown in FIG. 6, the user may also input contact information 618, including any number of email addresses, numbers, websites, and servers. As described above, the various contacts may be configured by the user to receive messages at different times and/or to different mailboxes according to the sender of the message.

Figure 7:
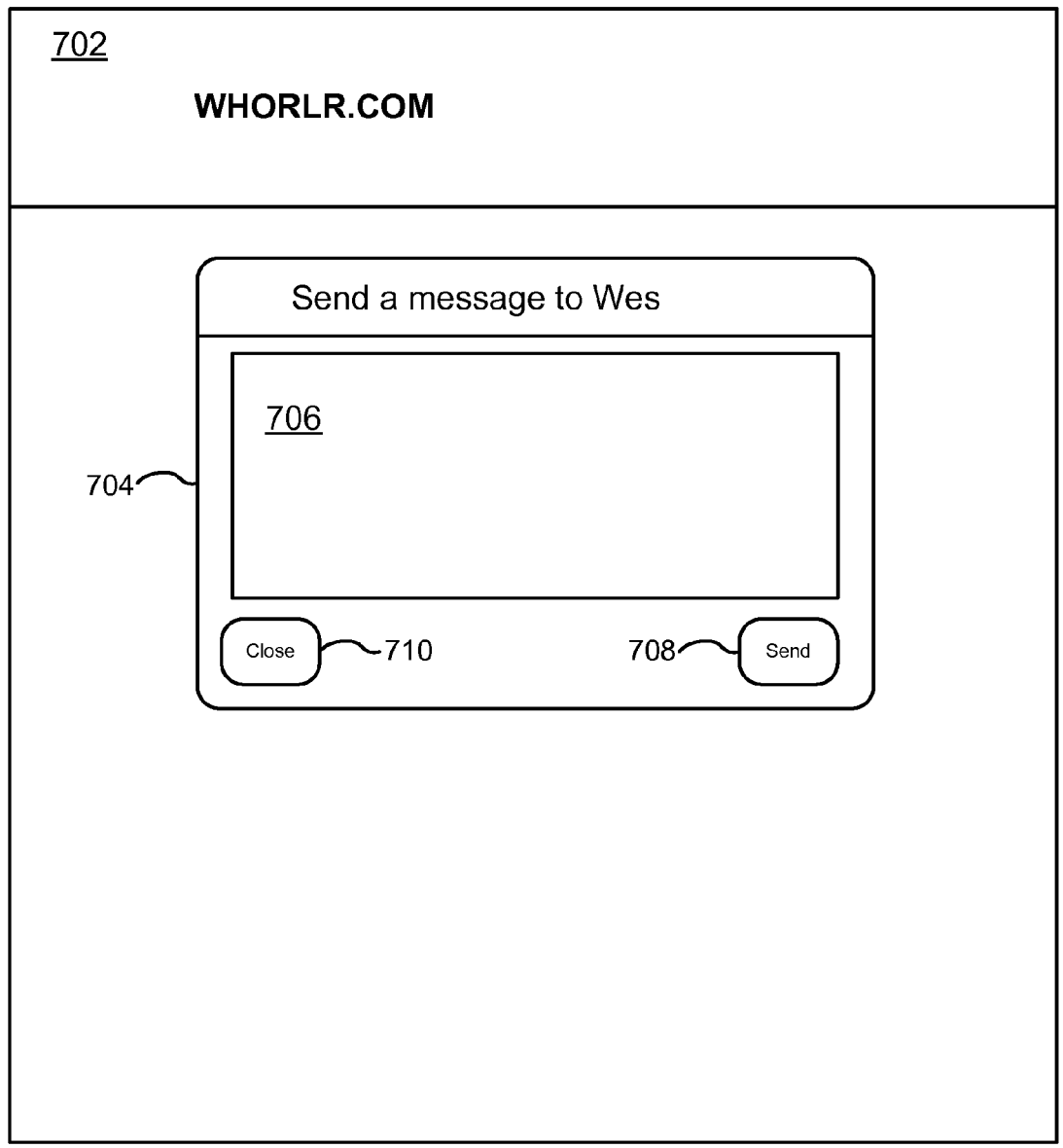
FIG. 7 is an illustration of an example display generated by the configurable web server system of FIG. 1.

FIG. 7 illustrates a display 702 generated by the system for sending a message to a user. A sender with permission to send a message to a particular user is, upon selecting a message icon or navigating to a message page, presented with a message window 704. The message window 704 includes a fillable box 706 for inputting the message. Upon input of the message, the user may send 706 the message to the recipient. Importantly, the recipient's contact information is not identified or displayed to the sender. Subject to the recipient's privacy settings, the sender may not know any of the recipient's contact information. However, the sender can send a message which is delivered to one or more mailboxes of the recipient based on the recipient's routing rules. For example, depending on the recipient's routing rules, the message may be received via an email address, as a text message to a telephone number, or to a facsimile machine or mailbox.

Figure 8:
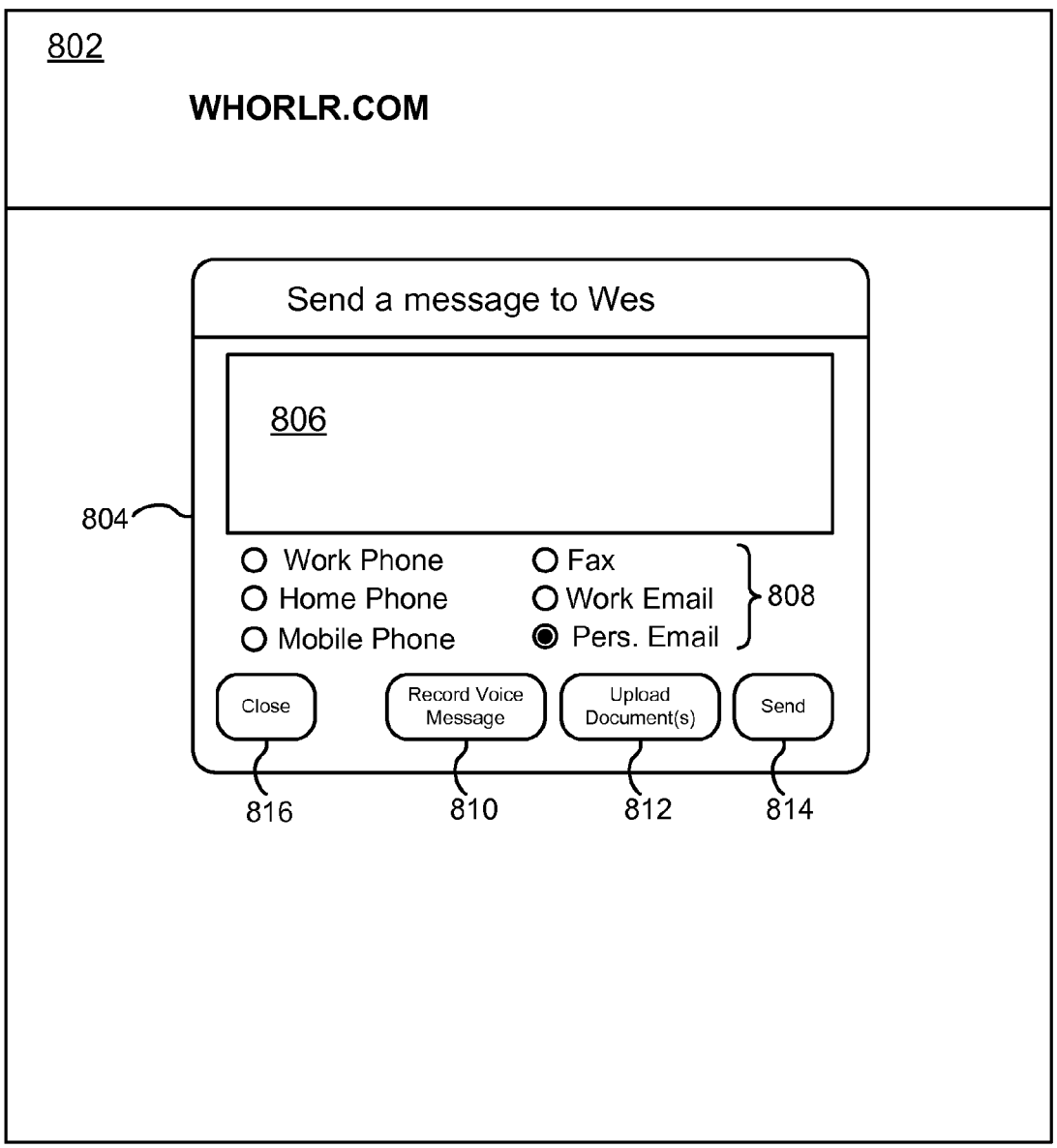
FIG. 8 is an illustration of an example display generated by the configurable web server system of FIG. 1.

FIG. 8 illustrates another display 802 generated by the system for sending a message to a user. In this embodiment, the sender may view and select one, or multiple, channels or mailbox types as the method of contacting the recipient. The mailbox types are general categories of contact or mailbox types and do not specifically identify any addresses or numbers associated with the recipient. For example, the sender may select whether to send a message to a particular category of telephone contacts (e.g., work, home, mobile), a category of email addresses (e.g., work, personal), or a facsimile mailbox or machine. In some embodiments, the sender may also select a category of servers or other document deliver means (e.g., FTP, drop box, etc.). The mailbox types may further include additional customized categories created by the message recipient.

A message may be inputted as text into a fillable box 806, recorded a voice message 810, or uploaded as a document 812. Provided that sender is authorized to message the recipient, the message is sent 814 to the recipient based on the mailbox category selection and the routing rules set up by the recipient.

By employing the messaging system described above, message addresses are kept private, but incoming messages are still allowed to be routed to one of several electronic inboxes as desired by the recipient/owner. Also provided is the ability to route incoming messages to a private address to an electronic box of a different messaging format, and the ability to limit incoming messages to an approved sender list. The ability to route the messages according to a matrix of parameters such as sender, time, date, etc. is also provided. In some embodiments, the messaging system also permits a sender to select the mailbox type or method of contacting the recipient.

Although the invention has been described with reference to a particular arrangement of parts, features and the like, these are not intended to exhaust all possible arrangements or features, and many modifications and variations will be ascertainable to those of skill in the art.

What is claimed is:

1. An electronic messaging system, comprising:
message server hardware available over a network;
software executing on said message server hardware for receiving from a message sender over the network a message and a recipient name provided without an address associated with the recipient name;
software executing on said message server hardware for determining, based at least in part upon the recipient name and a sender identifier, whether the message sender is authorized to send the message to a message recipient identified by the recipient name;
software executing on said message server hardware for displaying to the message sender a plurality of mailbox categories associated with the message recipient and receiving from the message sender a selection of a least one of the plurality of mailbox categories, wherein said software for displaying omits specific identification of any addresses of any of a plurality of electronic mailboxes associated with the message recipient;
software executing on said message server hardware for determining to which of the plurality of electronic mailboxes associated with the message recipient to route the message based at least in part on the mailbox category selection and routing rules stored by the message recipient; and
software executing on said message server hardware for routing the message to the determined one of the electronic mailboxes over the network;
wherein the system keeps the addresses of all of the plurality of electronic mailbox categories private from the message sender.

2. The electronic messaging system according to claim 1, wherein the plurality of mailbox categories include at least one email category and at least one telephone category.

3. The electronic messaging system according to claim 2, wherein the plurality of mailbox categories include a facsimile category.

4. The electronic messaging system according to claim 2, wherein the at least one email category includes a work email category and a personal email category.

5. The electronic messaging system according to claim 1, wherein the routing rules are stored in a database accessible by said message server hardware and comprise at least one rule associating at least one email address with a mailbox category.

6. The electronic messaging system according to claim 1, wherein the routing rules are stored in a database accessible by said message server hardware and comprise at least one rule associating at least one telephone number with a mailbox category.

7. The electronic messaging system according to claim 1, wherein the message routing rules are dependent upon the sender identifier.

8. The electronic messaging system according to claim 1, wherein the message routing rules are dependent upon a time of day.

9. The electronic messaging system according to claim 1, wherein the message routing rules are dependent upon a day of the week.

10. The electronic messaging system according to claim 1, wherein the message routing rules are dependent upon a particular date.

11. The electronic messaging system according to claim 1, wherein the message routing rules comprise a matrix dependent upon two or more of the following parameters: the message sender identifier, a time of day, a day of the week and a particular date.

12. The electronic messaging system according to claim 1, wherein the routing rules specify one or more formats in which the recipient desires to receive messages for each of the plurality of electronic mailboxes.

13. The electronic messaging system according to claim 12, further comprising message reformat software executing on the message server hardware for translating the message into a specified format before routing to the electronic mailbox.

14. The electronic messaging system according to claim 1, wherein the message and the recipient name are received from the message sender in response to a send message function being selected by the message sender on the private web page associated with the message recipient.

15. The electronic messaging system according to claim 1, wherein the message is received from the message sender via a private web page associated with the message recipient.

16. The electronic messaging system according to claim 1, wherein the message is received from the message sender via a non-public electronic mailbox address, whereby privacy of the message recipient is ensured.

17. The electronic messaging system according to claim 1, wherein network is the Internet.

18. The electronic messaging system according to claim 1, further comprising message recipient hardware connected to the network and in communication with said message server hardware.

19. The electronic messaging system according to claim 18, wherein the message recipient hardware comprises at least one of the following: a computer, a laptop, a mobile device and a smartphone.

20. The electronic messaging system according to claim 1, further comprising message sender hardware connected to the network and in communication with said message server hardware.

21. The electronic messaging system according to claim 20, wherein the message sender hardware comprises at least one of the following: a computer, a laptop, a mobile device and a smartphone.

22. A method of routing electronic messages comprising the steps of:
   providing a message server available over a network;
   receiving from a message sender over the network a recipient name provided without an address associated with the recipient name;
   determining, based at least in part upon the recipient name and a sender identifier, whether the message sender is authorized to send a message to the message recipient;
   receiving a message from the message sender over the network upon the message sender being authorized to send the message to the message recipient;
   displaying to the message sender a plurality of mailbox categories associated with the message recipient and omitting from the display specific identification of any addresses of the plurality of electronic mailbox categories;
   receiving from the message sender a selection of a least one of the plurality of mailbox categories;
   determining, based at least in part upon the mailbox category selection from the sender and routing rules stored by the message recipient, to which of a plurality of electronic mailboxe s to route the message; and
   routing the message, with the message server, to the determined one of the electronic mailboxes over the network while keeping the addresses of all of the plurality of electronic mailbox categories private from the message sender.

23. The method according to claim 22, wherein the plurality of mailbox categories include at least one email category and at least one telephone category.

24. The method according to claim 23, wherein the plurality of mailbox categories include a facsimile category.

25. The method according to claim 23, wherein the at least one email category includes a work email category and a personal email category.

26. The method according to claim 22, wherein the routing rules comprise at least one rule associating at least one email address with a mailbox category.

27. The method according to claim 22, wherein the routing rules comprise at least one rule associating at least one telephone number with a mailbox category.

* * * * *